United States Patent [19]

Vanderzee

[11] 4,023,407

[45] May 17, 1977

[54] CHUCK FOR TIRE UNIFORMITY MACHINE

[75] Inventor: Robert S. Vanderzee, Akron, Ohio

[73] Assignee: Akron Standard, division of Eagle-Picher Industries, Inc., Akron, Ohio

[22] Filed: Jan. 19, 1976

[21] Appl. No.: 650,131

[52] U.S. Cl. .................................................. 73/146

[51] Int. Cl.[2] ........................................ G01M 17/02

[58] Field of Search .......................... 73/146, 146.2; 33/178 R, 178 D, 169 R

[56] References Cited

UNITED STATES PATENTS 3,552,200 1/1971 Hermanns et al. .................. 73/146

3,895,518 7/1975 Leblond ............................. 73/146

*Primary Examiner*—Donald O. Woodiel

*Attorney, Agent, or Firm*—Wood, Herron & Evans

[57] ABSTRACT

An apparatus for accurately positioning a tire in a tire uniformity machine. The apparatus includes two members axially movable relative to each other and adapted to mate to form an annular channel for the mounting of a tire, radially movable pawls mounted in one of the members, and a plunger in the other member operative to cam the pawls into engagement with the two members when brought together to lock the members together and prevent their separation during operation of the machine.

10 Claims, 5 Drawing Figures

CHUCK FOR TIRE UNIFORMITY MACHINE

BACKGROUND OF THE INVENTION

This invention relates to a tire testing machine, and, more particularly, to a chuck for accurately positioning a tire in a tire testing machine.

In the manufacture of tires, various irregularities and variations in the dimensions in the tires can arises. For example, dimensional irregularities can arise from inaccuracies in the molding process, changes in the characteristics of the fabric and other materials and compounds employed in manufacturing the tires, inaccurate centering and stitching, and variations in the vulcanizing process. All of the possible irregularities and variations in the tires which can arise during manufacture either singularly through interaction with one another can cause eccentricity and static and dynamic unbalance in the tire which results in tire vibration and noise during use.

It is possible to correct many of these irregularities by first measuring the tire variations and then applying various corrective actions to the tire. To measure tire variations, the tire is placed on a tire uniformity machine in which the tire is mounted on the machine, inflated to tire pressure and rotated while a relatively sophisticated electrical means measures the variations and records them on an appropriate read out device such as an oscilloscope, oscillogram, dial or meter. To accurately measure the tire variations, however, it is necessary to accurately position the tire on the machine and to maintain the tire in position under tire pressure and while the tire is being rotated at relatively high speed. This often requires a chuck and heavy framing associated with the chuck and the machine to hold the tire in position.

It is an object of this invention to provide a chuck for a tire testing machine which eliminates the need for heavy framing and the like.

It is another object of this invention to provide a chuck for a tire testing machine which precisely aligns the tire in the machine.

It is another object of this invention to provide a chuck for a tire testing machine which allows for light framing and low pressures to bring the chuck members together and which provides a positive lock easily relieved to release the tire.

It is another object of this invention to provide a chuck with attached rims which engage the tire bead to provide a seal while placing the tire in precise alignment.

It is another object of this invention to provide a chuck meeting the above objectives which further provides for the convenient introduction of air to inflate the tire.

SUMMARY OF THE INVENTION

These and other objectives are accomplished by providing a chuck including a first member having a pawl receiving surface and having a plurality of pawls radially mounted therein, a second member axially movable with respect to the first member having a pawl receiving surface, and a plunger in the second member. Fluid pressure means moves the members together. When the two members are brought together, the plunger cams the pawls into the pawl receiving surfaces to lock the members together.

The two members further include precision alignment surfaces which mate when the two members are brought together to precisely align the tire in the machine.

A spring moves the plunger out of engagement with the pawls when it is desired to open the chuck, and springs associated with the pawls move the pawls out of engagement with the pawl receiving surface when the plunger is moved out of engagement with the pawls to unlock the chuck members and release the tire.

A mechanical stop is provided in the second member to limit the advance of the plunger to its position of optimum locking capability.

A rim is attached to each member which engages the tire bead when the members are brought together to provide a seal while placing the tire in precise alignment.

The second member includes a plurality of openings which allow passage of air from inside the members to inflate the tire.

Other objects and advantages will be apparent from the following detailed description of the invention, reference being made to the accompanying drawings.

DESCRIPTION OF THE PREFERRED EMBODIMENT

Figure 1:
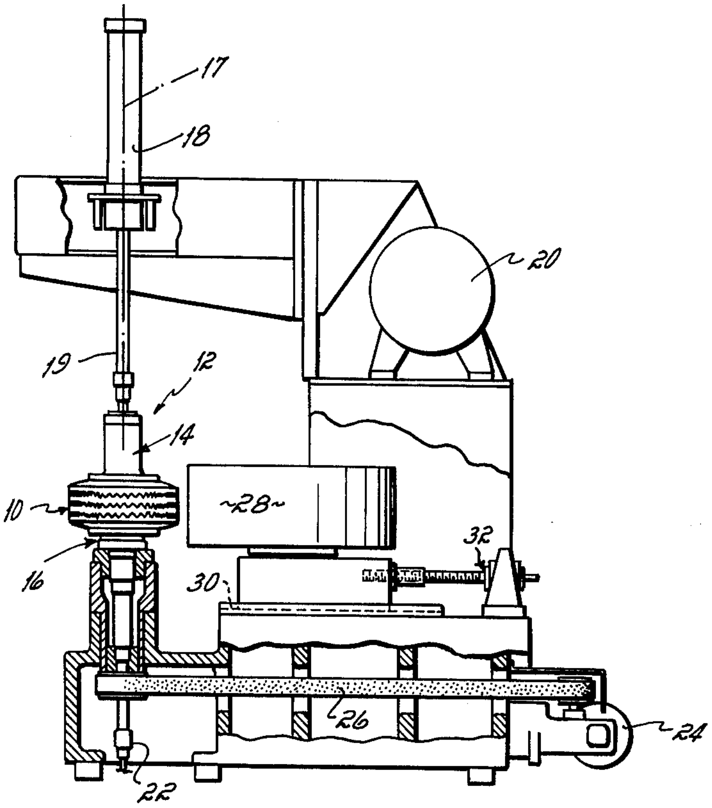
FIG. 1 is a simplified illustration of a tire uniformity machine illustrating the environment of my invention.

FIG. 1 shows a tire uniformity machine wherein a tire 10 is mounted in a chuck 12. The chuck 12 includes two members, a male chuck member 14 and a female chuck member 16. The male member 14 is reciprocally movable along a vertical axis 17 that is the longitudinal axis of the apparatus by means of a fluid pressure means such as an hydraulic cylinder 18 and interconnecting rod 19 such that the chuck 12 cn be opened for the placement of the tire 10 thereon and closed and locked to position and hold the tire during operation of the uniformity machine. When the chuck is in the closed and locked position, as shown in FIG. 1, the tire is inflated by air from an air tank 20 communicating with and centrally through the female chuck member 16 by means of an air rotary union 22. Once inflated, the tire is rotated by means of a motor 24 and drive belt 26 attached to the female chuck member 16. The female chuck member 16 rotates both the tire 10 and the male chuck member 14 about the axis 17 of the apparatus in the closed and locked position while the rod 19 remains immobile.

With the tire is rotation, a sensing device is activated to measure variations and irregularities in the tire. In FIG. 1, this sensing device is illustrated as a load cell 28 which rides on tracks 30 and is movable into engagement with the tire 10 by means of a motor and screw 32. The electrical signals generated by the load cell are relayed to a suitable read out device (not shown) to record the variations.

Figure 2:
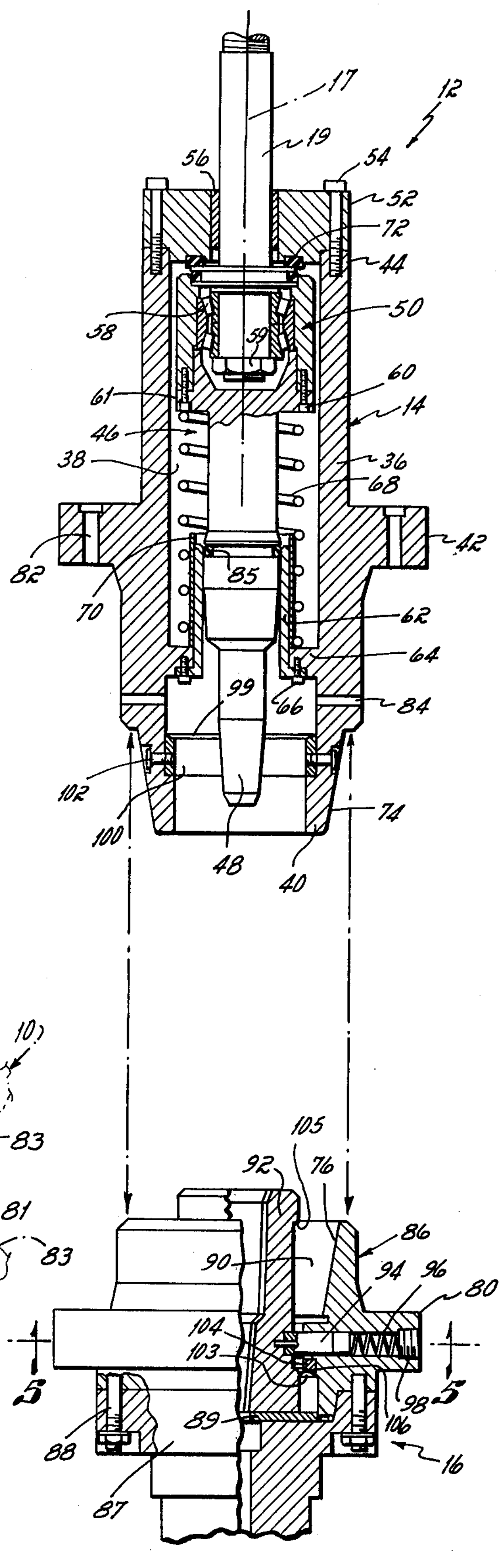
FIG. 2 is an axial cross-sectional view with parts in elevation of the chuck showing the chuck in the open position.

Referring now to FIG. 2, the male chuck member 14 includes a cylindrical housing 36 having a longitudinal bore 38 therethrough centrally thereof and terminating in an annular end 40. The housing 36 also includes a radially extending flange 42 intermediate the end 40 and the opposite end 44. Within the bore 38 is a plunger assembly 46 including a tapered plunger 48 attached to the rod 19 by means of a bearing assembly 50. The plunger 48 is reciprocable within the bore 38 along the longitudinal axis 17 of the apparatus. The plunger 48 is attached at its one end to the rod 19 which extends into the bore 38 of the housing 36 through an end cap 52. The end cap 52 is attached to the end 44 of the housing 36 by means of bolts 54 and includes a sleeve bearing 56 engaging the cylindrical surface of the rod 19. The attachment of the plunger 48 to the rod 19 is by means of the bearing assembly 50 which includes tapered roller bearings 58 held in place on the rod 19 by a lock nut 59 with the assembly 50 being attached by screws 60 to a flange 61 of the plunger 48. At its opposite end, the plunger 48 is located in the bore 38 and reciprocates in a cylindrical sleeve 62 attached to a radially inwardly extending lip 64 of the housing 36 by means of screws 66. The plunger assembly 46 is rotatable on the rod 19 about the longitudinal axis 17 of the apparatus on the tapered bearings 58, and the housing 36 is likewise rotatable on the rod 19 at the sleeve bearing 56.

A helical spring 68 is positioned in the bore 38 about the plunger 48 and extends between the flange 61 and the lip 64. On advance of the plunger 48 toward the female member 16, the spring 68 interposed between the flange 61 and the lip 64 causes the male member 14 to advance into engagement with the female member 16 to close the chuck. The spring 68 holds the chuck members together in the chuck closed position. The spring 68 is compressed on the further advance of the plunger 48 toward the female member 16 until the flange 61 contacts a mechanical stop in the form of a second cylindrical sleeve 70 surrounding the sleeve 62 which serves to limit the advance of the plunger 48 to its optimum locking position. On release of the fluid pressure, the spring 68 returns the plunger 48 into the bore 38 until the plunger assembly 46 contacts a stop 72, shown in FIG. 2 as an elastomeric bumper.

Figure 3:
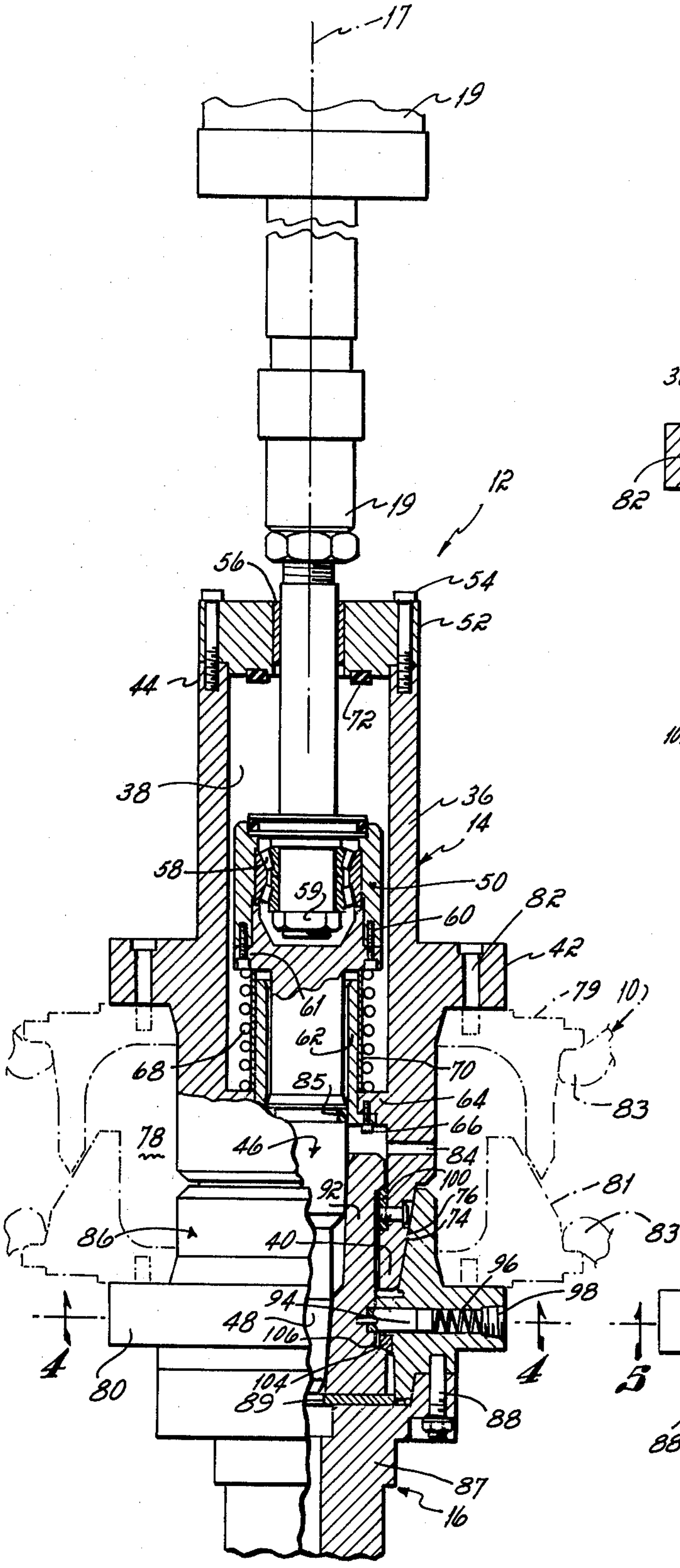
FIG. 3 is an axial cross-sectional view similar to FIG. 2 showing the chuck in the closed and locked position.

Since precision alignment of the chuck members is of utmost importance, the annular end 40 of the housing 36 is provided with a precision frustoconical alignment surface 74 machined accurately concentric to the longitudinal axis 17. The female member 16 is provided with a like frustoconical alignment surface 76 adapted to tightly mate with surface 74 in the chuck closed position to accurately define an annular channel 78 thereabout extending between the radial flange 42 of the male member and a like radial flange 80 of the female member, as shown in FIG. 3. For purposes of mounting the tire on the chuck, annular rims 79 and 81 (shown in phantom) are attached to the flanges 42 and 80, respectively, of the chuck members by bolts (not shown) in bores 82 in the flanges. The rims 79 and 81 are adapted to engage the bead 83 (shown in phantom) of the tire and form a seal therebetween on inflation of the tire. The rims allow for the passage of tire inflation air from the channel 78 which enters the chuck centrally of the female member through the air rotary union 22 and passes through a plurality of openings 84 in the male member 14 into the channel 78. An O-ring 85 on the plunger 48 prevents leakage of the inflation air around the plunger.

Referring again to FIG. 2, the female chuck member 16 includes a main chuck portion 86 mounted on a platen 87 by bolts 88 with an annular gasket 89 therebetween. The main chuck portion 86 has a recess 90 therein centrally thereof and has at its end opposite the male member 14 the frustoconical precision alignment surface 76 adapted to tightly mate with the surface 74 of the end 40 of the male member 14 in the closed position.

Figure 4:
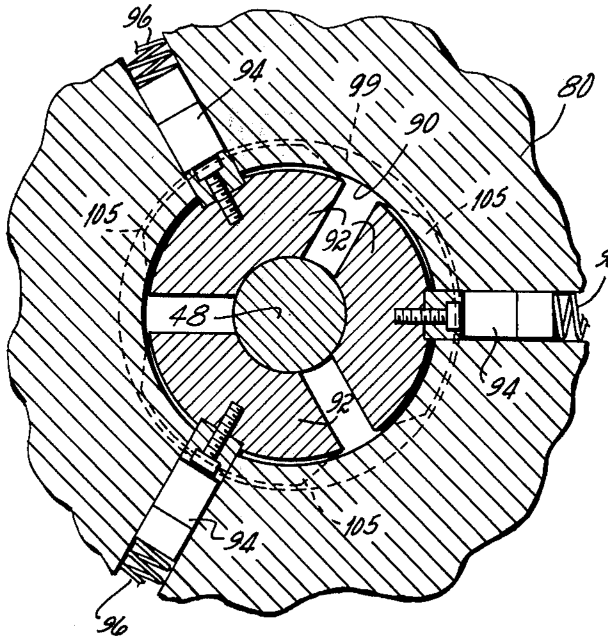
FIG. 4 is a cross-sectional view taken along line 4—4 of FIG. 3.
Figure 5:
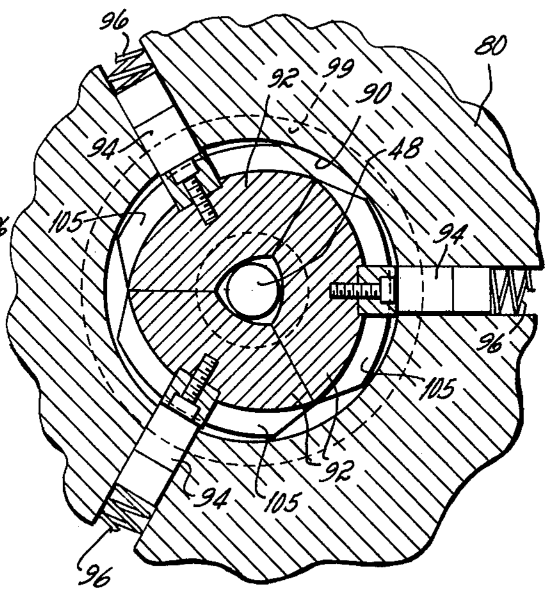
FIG. 5 is a cross-sectional view taken along line 5—5 of FIG. 2.

Within the recess 90 are located three equally spaced pawls 92 which are held in position by means of individual pins 94 and springs 96 held in the radial flange 80 of the female member 16 by means of plugs 98. The pawls 92 are radially outwardly movable between unlocked position wherein the plunger 48 is out of engagement therewith, as shown in FIG. 5, and a chuck locked position wherein the plunger 48 is fully advanced into engagement with the pawls 92, as shown in FIG. 4. In the chuck locked position, the pawls 92 engage at one end a pawl receiving surface 99 of a metal ring 100 attached by means of screws 102 to the end 40 of the male member 14. At their opposite ends, the pawls engage another pawl receiving surface 103 of a metal ring 104 attached to the female member 16 to lock the male and female members together and to resist their separation during operation of the machine. The engaging surfaces 105, 106 of the pawls 92 and the pawl receiving surfaces 99 and 103 of the rings 100 and 104, respectively, are also accurately machines frustoconical surfaces to ensure accurate mating of the elements and tight locking of the chuck members.

OPERATION

In operation, the chuck 12 is in the open position wherein the male member 14 is fully raised and the plunger assembly 46 is fully retracted within the male member 14, as shown in FIG. 2. A tire is then placed on the rim 81, which is bolted to the flange 80 of the female member 16. The hydraulic cylinder 18 is actuated to lower the male member 14 into engagement with the female member 16 with the end 40 first contacting the alignment surface 76, which serves to guide the end 40 into the recess 90. When the precision alignment surfaces 74, 76 tightly engage, the male member is fully advanced and the chuck is closed position with the rim 79 bolted to flange 42 of male member 14 engaging the bead 83 of the tire. In the closed position, the annular channel 78 is accurately defined and thereby the tire 10 is accurately positioned and is ready for inflation.

Before inflation, however, the hydraulic cylinder 18 continues its advance compressing spring 68 and forcing the plunger assembly 46 out of the bore 38 whereby the plunger 48 is advanced toward the female member 16 and into engagement with the pawls 92. As the plunger 48 engages the pawls 92, the plunger 48 overcomes the springs 96 and cams the pawls 92 radially outwardly and into engagement with the rings 100, 104. When the flange 61 engages the stop sleeve 70, the helical spring 68 is fully compressed and the plunger 48 is at its position of optimum locking capability and the pawls 92 are in their optimum locking position. The chuck members 14, 16 are now in the closed and locked position, as shown in FIG. 2. Air is introduced through the female member 16 and the openings 84 in the male member 14 into the channel 78 to inflate the tire. When the tire is inflated, the motor 24 is actuated to rotate the female member 16 and thus the tire 10. With the male member 14 locked into engagement with the female member 16, the male member is driven by the female member whereby the male member including the plunger assembly 46 rotates on the stationary rod 19. During rotation, the pawls are held in tight locking engagement by the plunger 48 thereby preventing separation on the chuck members under the pressure of the inflated tire and the forces imposed on the tire during rotation.

To move the chuck members to the open position for removal of the tire from the uniformity machine, the tire inflation air pressure and the hydraulic fluid pressure are released. On release of the fluid pressure, the helical spring 68 expands thereby retracting the plunger assembly 46 into the bore 38. As the plunger assembly retracts, the plunger 48 is moved out of engagement with the pawls 92. The springs 96 then move the pawls 92 radially inwardly thus unlocking the chuck members. On full expansion of helical spring 68, the plunger assembly 46 contacts the bumper 72. The hydraulic cylinder 18 is now actuated to raise the male member to the open position, as shown in FIG. 3, so that the tire can be lifted from the machine, another tire placed thereon and the process repeated.

Although my invention has been described in terms of a specific preferred embodiment, it will be understood that other forms may be adopted within the scope of the invention.

I claim:

1. A chuck for a tire testing apparatus comprising, a first member having a pawl receiving surface and having a plurality of pawls radially mounted therein;

a second member axially movable with respect to said first member having a pawl receiving surface;

a plunger in said second member; and means for moving said members together;

said plunger camming said pawls into engagement with said pawl receiving surfaces when said two members are brought together to lock said members together.

2. Claim 1 wherein said members include precision alignment surfaces adapted to mate when said members are brought together.

3. Claim 1 wherein said second member includes a spring for moving said plunger out of engagement with said pawls and said first member includes springs for moving said pawls out of engagement with said pawl receiving surface when said plunger is moved out of engagement with said pawls.

4. Claim 1 wherein said second member includes stops means for limiting the advance of said plunger to its optimum locking position.

5. Claim 1 wherein each of said members includes a rim which engages the tire bead when said members are brought together.

6. Claim 1 wherein said second member includes a plurality of openings through which air may pass for inflating the tire.

7. A chuck for use in a tire testing machine comprising, in combination, a first chuck member having a recess therein centrally thereof and a plurality of pawls mounted within said recess, said pawls being radially movable between a chuck unlocked position and a chuck locked position, and having a pawl receiving surface, a second chuck member axially movable with respect to said first member having a longitudinal bore therethrough centrally thereof terminating in an annular end portion and a pawl receiving surface in said bore, a plunger reciprocable in said bore, said first member and said end portion of said second member having precision alignment surfaces adapted to tightly mate when said members are brought together to accurately define an annular channel thereabout for the mounting of a tire, fluid pressure means for moving said member together and for advancing said plunger into engagement with said pawls, said plunger camming said pawls into engagement with said pawl receiving surfaces when said two members are brought together to lock said members together.

8. Claim 7 wherein said alignment surfaces are frustoconical in configuration.

9. Claim 7 wherein said second member includes a stop mounted in said bore for limiting the advance of said plunger to its optimum locking position.

10. A chuck for use in a tire testing machine comprising, in combination, a male chuck member comprising a cylindrical housing having a radially outwardly extending flange, a radially inwardly extending lip and a longitudinal bore therethrough centrally thereof terminating in an annular end portion, a female chuck member having a radially outwardly extending flange and a recess therein centrally thereof adapted to receive said male member to form an annular channel about said chuck members extending between said flanges for the mounting of a tire, a plunger reciprocable within said bore, said end portion of said male member and said female member having frustoconical precision alignment surfaces concentric to the longitudinal axis of the apparatus adapted to tightly mate and to accurately define said channel, said housing further having a plurality of radially disposed openings in fluid flow communication with said channel and with said bore through which air may pass for inflating the tire, said male member being reciprocable on said longitudinal axis between an open position and a closed position wherein said precision alignment surfaces are tightly mated, both of said members being rotatable about said axis in said closed position, three equally spaced pawls mounted within said recess having a pair of longitudinally spaced frustoconical surfaces, said pawls being radially movable between a chuck unlocked position and a chuck locked position wherein said surfaces tightly engage pawl receiving surfaces of said male and female members in said closed position to maintain said alignment surfaces in tightly mated relationship, said pawls being held in said recess and biased inwardly therein by individual pins and springs mounted in a radially extending bore in said flange of said female member, said plunger camming the spring biased pawls radially outwardly from said unlocked position to said locked position, an hydraulic cylinder for reciprocally moving said male member and for advancing said plunger into engagement with said pawls, a cylindrical sleeve mounted in said cavity on said lip and surrounding said plunger operative to engage said plunger to limit its advance to its optimum locking position, and a helical spring mounted in said cavity on said lip and surrounding said cylindrical sleeve for moving said plunger out of engagement with said pawls, said pawls returning to said unlocked position when said plunger is moved out of engagement therewith.

* * * * *